US007002460B2

(12) United States Patent
Bolander et al.

(10) Patent No.: US 7,002,460 B2
(45) Date of Patent: Feb. 21, 2006

(54) INTELLIGENT BRAKE AND REVERSE LIGHT CONTROL

(75) Inventors: Thomas E. Bolander, Flint, MI (US); Alexander J. Roberts, Rochester, MI (US); Michael A. Kropinski, Troy, MI (US)

(73) Assignee: General Motors Corporation, Detroit, MI (US)

( * ) Notice: Subject to any disclaimer, the term of this patent is extended or adjusted under 35 U.S.C. 154(b) by 85 days.

(21) Appl. No.: 10/772,994

(22) Filed: Feb. 5, 2004

(65) Prior Publication Data

US 2005/0174227 A1    Aug. 11, 2005

(51) Int. Cl.
*B60Q 1/44* (2006.01)
(52) U.S. Cl. ...................... 340/479; 340/463; 340/464; 340/468
(58) Field of Classification Search ................ 340/479, 340/463, 464, 468
See application file for complete search history.

(56) References Cited

U.S. PATENT DOCUMENTS

| 5,164,701 | A  | * | 11/1992 | Nan-Mu et al. ............. 340/464 |
| 6,225,896 | B1 | * | 5/2001  | Sendowski ................... 340/467 |
| 6,243,008 | B1 | * | 6/2001  | Korabiak ..................... 340/463 |
| 6,356,190 | B1 | * | 3/2002  | Albrecht ...................... 340/479 |
| 6,411,204 | B1 | * | 6/2002  | Bloomfield et al. ......... 340/467 |

* cited by examiner

*Primary Examiner*—Daryl C Pope
(74) *Attorney, Agent, or Firm*—Laura C. Hargitt

(57) ABSTRACT

Methods and apparatus are provided for controlling brake-lights and reverse-lights on a vehicle. The apparatus comprises a vehicle speed sensor and a PRNDL selector capable of selecting at least PARK and REVERSE modes of operation. A control unit is coupled to the brake-light, to the reverse-light, to the vehicle speed sensor, and to the PRNDL selector, for illuminating the brake-light when the headlight is on and the vehicle is not moving, when the vehicle is not in PARK and is not moving, and when the vehicle's deceleration reaches a predetermined threshold, and for illuminating the reverse-light when the vehicle is not in REVERSE and is moving backwards.

19 Claims, 3 Drawing Sheets

INTELLIGENT BRAKE AND REVERSE LIGHT CONTROL

FIELD OF THE INVENTION

This invention relates generally to a vehicular light control system, and more particularly to a method and apparatus for controlling the brake-lights and the reverse (i.e. backup) lights on automobiles, sport utility vehicles, trucks, and the like.

BACKGROUND OF THE INVENTION

When the use of motor vehicles as a means of transportation became commonplace, it soon became obvious that such vehicles should be equipped with a warning system to alert the driver of a vehicle that an anterior vehicle is stopping or braking so as to prevent rear end collisions resulting in possible damage to the vehicles involved and injury to the vehicle's occupants. To this end, the well known brake-light was widely adopted and is illuminated when an operator of a vehicle steps on or depresses the vehicles brake pedal to stop or slow the vehicle. Such brake-lights are now generally required to be operational on a vehicle before such vehicle may be legally operated on a public thoroughfare. Such brake-lights convey a clear, unambiguous alert to following vehicles that a driver is braking.

In addition to brake-lights, vehicles are now generally equipped with reverse (i.e. backup) lights to assist an operator of a vehicle when the operator is backing the vehicle up (i.e. operating the vehicle in reverse gear or mode). Such reverse-lights are typically activated (i.e. illuminated) when the vehicle is placed in reverse gear. For example, the reverse-lights may be activated when a PRNDL (pronounced "prendel") selector indicates that the vehicle's transmission has been placed in reverse gear. The letters P, R, N, D, L associated with the PRNDL selector indicate PARK, REVERSE, NEUTRAL, DRIVE, AND LOW gears.

It should be clear from the above that the well known brake and reverse lighting systems provide valuable assistance to vehicle operators and enhance vehicle safety. It has been realized, however, that additional intelligence may be incorporated into such systems so as to warn drivers of other possible safety hazards and/or dangerous conditions. Accordingly, it is desirable to provide an improved brake-light/reverse-light warning system that is responsive to additional driving safety considerations.

BRIEF SUMMARY OF THE INVENTION

According to an aspect of the invention there is provided a light control system for use on a vehicle having a brake-light and a headlight. The system comprises a vehicle speed sensor and a control unit coupled to the brake-light, to the headlight, and to the vehicle speed sensor. The control unit illuminates the brake-light when the headlight is on and the vehicle is not moving.

According to the further aspect of the invention there is provided a light control system for use on a vehicle having a brake-light, and a PRNDL selector capable of selecting at least PARK and REVERSE modes of operation. The system also comprises a vehicle speed sensor, a control unit coupled to the brake-light, to the PRNDL selector, and to the vehicle speed sensor for illuminating the brake-light when the vehicle is not in PARK and is not moving.

According to a still further aspect of the invention there is provided a light control system for use on a vehicle having a reverse-light. The system comprises a vehicle speed sensor, a PRNDL selector capable of selecting at least PARK and REVERSE modes of operation, and a control unit coupled to the reverse-light, to the vehicle speed sensor, and to the PRNDL selector, for illuminating the brake-light when the vehicle is not in PARK and is not moving.

According to yet another aspect of the invention there is provided a method for controlling the lights on a vehicle having a brake-light and a headlight. The method comprises monitoring the speed of the vehicle, determining if the headlight is on or off, and illuminating the brake-light when the headlight is on and the vehicle is not moving.

According to still another aspect of the invention there is provided a method of controlling lights on a vehicle having a brake-light and a PRNDL selector of the type which is capable of selecting at least PARK and REVERSE modes of operation. The method comprises sensing the speed of the vehicle, monitoring the PRNDL selector, and illuminating the brake-light when the vehicle is not in PARK and is not moving.

According to yet another aspect of the invention there is provided a method of controlling lights on a vehicle having a reverse-light and having a PRNDL selector capable of selecting at least PARK and REVERSE modes of operation. The method comprises sensing the speed of the vehicle, monitoring the state of the PRNDL selector, and illuminating the reverse-light when the vehicle is not in REVERSE and is moving backwards.

BRIEF DESCRIPTION OF THE DRAWINGS

The present invention will hereinafter be described in conjunction with the following drawings, wherein like reference numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any express or implied theory presented in the preceding technical field, background, brief summary, or the following detailed description.

Figure 1:
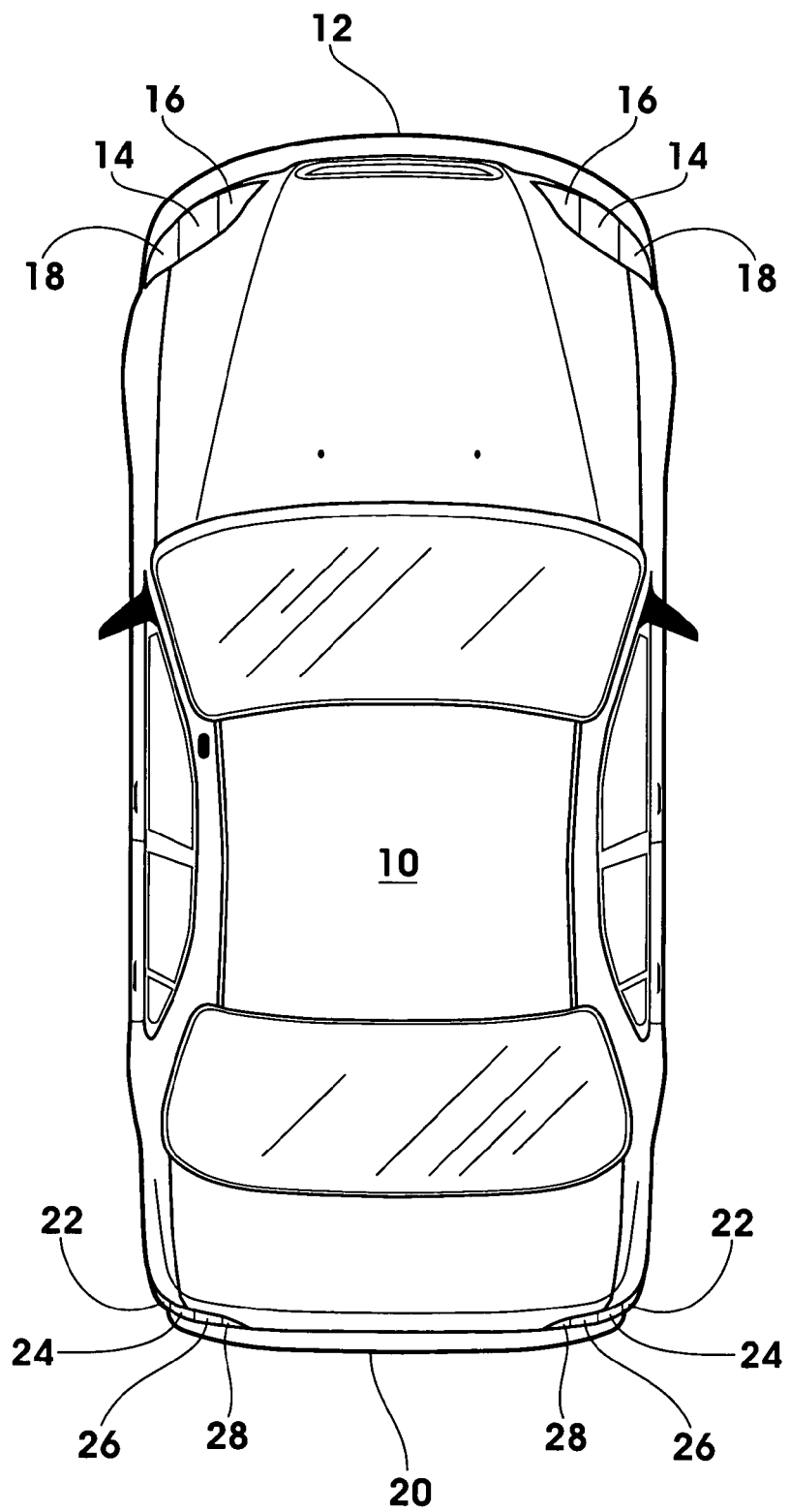
FIG. 1 is a top view of a vehicle equipped with headlights, brake-lights, and reverse-lights.

Referring now to FIG. 1, there is shown a top view of vehicle 10 illustrating the general position of lights on a vehicle such as an automobile, truck, etc. As can be seen, the front 12 of vehicle 10 may be equipped with first and second headlights 14, parking lights 16, and turn signal lights 18. Proximate the rear 20 of vehicle 10, there may be found turn signal lights 22, brake-lights 24, tail lights 26, and reverse-lights 28. Of course, the exact arrangement of operating lights on different vehicles or models thereof may vary somewhat. For example, front parking lights 16 and turn signal lights 18 may, if desired, share the same lamp. Similarly, rear turn signals 22 and brake-lights 26 may share the same lamp.

As stated previously, brake-lights 26 are generally illuminated when an operator of a vehicle steps on the vehicle's brake pedal to initiate stopping or slowing of the vehicle. This alerts following drivers that the vehicle in front is slowing. Reverse or backup lights 28 are typically illuminated when the operator of the vehicle places the vehicle in REVERSE gear in order to move the vehicle in a backward direction; as, for example, when backing out a driveway. The reverse or backup lights 28 serve two functions. First, if ambient light is low (e.g. in the evenings), the backup lights visually assist the operator of the vehicle. Second, the mere fact that the reverse-lights are illuminated will alert the drivers of other vehicles in the immediate vicinity that the vehicle is or will be moving in a rearward direction.

Unfortunately, there are other situations which merit alerting the operators of other nearby vehicles. For example, it would be desirable to illuminate the vehicle's brake-lights if the vehicle is decelerating at a rate which exceeds a predetermined threshold. Thus, even though the vehicle's brakes have not been applied, the following vehicles are alerted that the vehicle in front if decelerating. It would also be appropriate to illuminate the brake-lights when the vehicle is not in PARK and is not moving or when the vehicle's head lamps are on and the vehicle is not moving. Either of these scenarios could indicate, for example, a vehicle stalled in the middle of the road. Illuminating the brake-lights under these conditions would warn other drivers in the vicinity of a possible dangerous condition.

Figure 2:
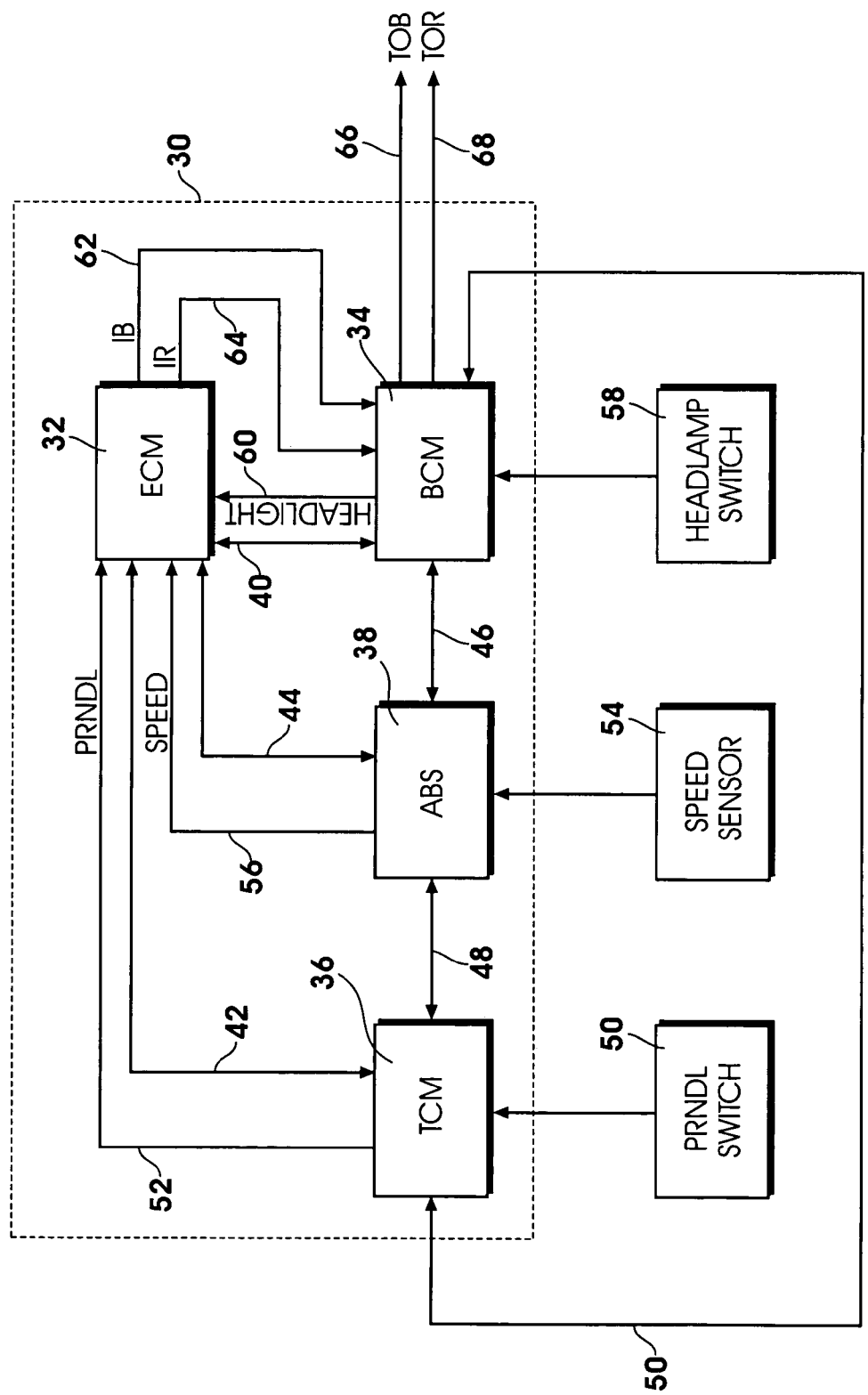
FIG. 2 is a block diagram of the inventive light control system for controlling the brake and reverse-lights shown in FIG. 1.

FIG. 2 is a block diagram of a first embodiment of the inventive vehicular light control system that utilizes the brake-lights and reverse-lights in such a manner so as to provide for the additional safety considerations described above. The system shown in FIG. 2 comprises a control unit 30 which is preferably microprocessor based. While control unit 30 may be configured in any one of a number of ways, it is shown in FIG. 2 as comprising control modules currently found on many automobiles. For example, referring to FIG. 2, control unit 30 comprises an engine control module (ECM) 32, a body control module (BCM) 34, a transmission control module (TCM) 36 and an anti-lock braking system (ABS) 38.

Engine control module 32 is an onboard, preferably micro-processor based, computer that operates to control and manage the overall operation of the vehicle's engine. Engine control module 32 may include a memory as well as a number of inputs and outputs for interfacing with various sensors and systems. As is well known, engine control module 32 preferably includes one or more control algorithms for controlling various aspects of engine operation.

As stated previously, engine control module 32 includes a number of inputs and outputs for communicating with various other systems. For example, engine control module 32 is bi-directionally coupled to body control module 34, transmission control module 36, and anti-lock brake system 38 by means of bi-directional data buses 40, 42, and 44 respectively. In this manner, engine control module may receive data relating to intake manifold temperature, intake manifold pressure, differential pressure, etc. Engine control module 32 may also output data for controlling one or more engine functions; e.g. controlling the flow of re-circulated exhaust gas from an exhaust manifold to an intake manifold, controlling turbo-charger swallowing capacity and/or efficiency, etc. Engine control modules of this type are well known and further discussion is not deemed necessary. However, the interested reader is referred to U.S. Pat. No. 6,619,261 issued Sep. 16, 2003 entitled "SYSTEM FOR CONTROLLING AN OPERATING CONDITION OF AN INTERNAL COMBUSTION ENGINE" assigned to Cummins, Inc., the teachings of which are hereby incorporated by reference.

Body control module 34 is another well known onboard microprocessor-based module whose function it is to monitor and control the vehicles body systems, such as HVAC climate control, displays, power windows, power locks, vehicle lighting, etc. For further discussion, see U.S. Pat. No. 5,320,383 entitled "AUTOMATIC VENTING SUPPLEMENTAL INFLATABLE RESTRAINT SYSTEM" issued Jun. 14, 1994 and assigned to the assignee of the present invention, the teachings of which are hereby incorporated by reference.

Transmission control module 36 is coupled via serial communication link 42 to engine control module 32. Among other things, transmission control module 36 may communicate the engine torque limit to engine control module 32. Transmission control module 36 communicates with body control module 34 by means of bidirectional communication link 50. For a further discussion, see U.S. Pat. No. 6,511,399 entitled "TORQUE AND POWER CONTROL IN A POWERTRAIN" issued Jan. 28, 2003 and assigned to the assignee of the present invention, the teachings of which are hereby incorporated by reference.

As can be seen, anti-lock braking system 32 communicates with engine control module 32, body control module 34, and transmission control module 36 by means of bi-directional communication links 44, 46 and 48 respectively. When the brakes of the vehicle are applied, a braking force is generated between the wheel and the road surface that is dependant upon various parameters including road surface conditions and the amount of slip between the wheel and the road surface. The braking force increases as slip increases until a critical slip value is surpassed beyond which the braking force decreases and the wheel rapidly approaches a lock-up condition. To achieve stable braking, an anti-lock braking control system attempts to keep wheel slip at or near the critical value. Such anti-lock brake systems are well known and further discussion is not deemed necessary at this time; however, the interested reader is referred to U.S. Pat. No. 5,385,394 entitled "ANTI-LOCK BRAKE SYSTEM WITH CONTROLLED PRESSURE AUGMENTATION" issued Jan. 31, 1995 and assigned to the assignee of the present invention, the teachings of which are hereby incorporated by reference.

Referring again to FIG. 2, it can be seen that a PRNDL switch or selector 50 has an output coupled to the input of transmission control module 36. Transmission control module 36 in turn provides an output 52 to engine control module 32 which comprises a PRNDL signal and indicates to engine control module 32 what mode (i.e. PARK, REVERSE, NEUTRAL, DRIVE, LOW) the vehicle is currently operating in.

Speed sensor system 54 has an output coupled to an input of anti-lock brake system 38 and provides information thereto indicative of vehicle speed. Anti-lock brake system 38 in turn provides speed related data to engine control module 32 over communication link 56. A head lamp switch or selector 58 is coupled to body control module 34 for the purpose of supplying body control module 34 with information relating to the state of the vehicle's head lamps (i.e. are the head lamps on or off). Body control module 34 in turn provides information to engine control module 32 regarding the state of the headlamps via communication link 60.

Engine control module 32 receives PRNDL data from transmission control module 36 via communication link 52, speed data from anti-lock brake system 38 via communication link 56, and head lamp data from body control module 34 via communication link 60. Engine control module 32 computes the vehicle's deceleration rate and determines if it is greater than a predetermined threshold. From this data, engine control module 32 generates an illuminate brake-light signal (IB) and an illuminate reverse-light signal (IR) and supplies these signals to body control module 34 via communication links 62 and 64 respectively. In turn, body control module 34 generates signals that turn the brake-lights on (TOB) and turn the reverse-lights on (TOR) via lines 66 and 68 respectively, which in turn results in illuminating the brake-lights and/or reverse-lights as the case may be.

Figure 3:
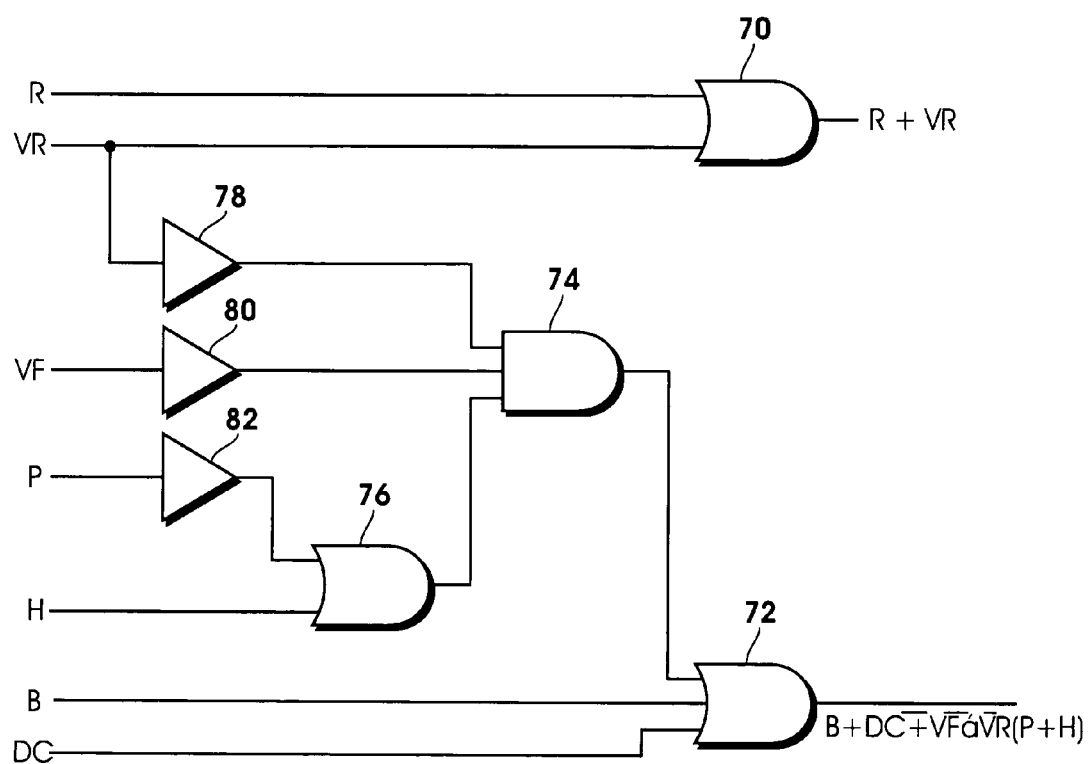
FIG. 3 is a general logic schematic illustrating one possible implementation for carrying out the control functions of the system shown in FIG. 2.

In accordance with the teachings of the present invention, the inventive light control system will cause the brake-lights to be illuminated not only when the brake pedal is depressed but also when the vehicle is decelerating at a predetermined rate, the headlights are on and the vehicle has no forward or rearward velocity, or when the vehicle has no forward or rearward velocity and the vehicle is not in PARK. Engine control module 32 will cause the reverse-lights to be illuminated not only when the vehicle is in REVERSE, but also when the vehicle has a rearward velocity independent of the state of the PRNDL selector. The generation of these signals can be produced in engine control module 32 by means of an algorithm, circuitry, or a combination of both. One example of a logic circuit for carrying out the required logical functions in order to illuminate the brake-lights and reverse-lights at the appropriate times is shown in FIG. 3.

A brake-light illumination function may be represented by the logical function $$TOB = B + DC + \overline{VR} \cdot \overline{VF}(P+H)$$

where each of the variables are capable of assuming a high state (e.g. a logical one) or a low state (e.g. a logical zero). In the case of equation 1, VB is high when the vehicle in question has a rearward velocity, VF is high when the vehicle has a forward velocity, P is high when the vehicle's PRNDL selector is in PARK, H is high when the vehicle's head lamps are illuminated, B is high when the operator of the vehicle is slowing the vehicle using the brake pedal, and DC is high when the vehicle is decelerating at a predetermined rate.

In a similar manner, a reverse-light illumination function may be represented by $$TOR = R + VR \qquad (2)$$

That is, the reverse-lights will be illuminated when either the PRNDL selector is in the REVERSE position or the vehicle has a rearward velocity.

Referring to FIG. 3, there is shown a logical implementation of equations 1 and 2. The circuit comprises first, second and third OR-gates 70, 72 and 76 respectively, AND gate 74, and inverters 78, 80, and 82. The reverse-light illumination function appears at the output of OR-gate 70. OR-gate 70 has a first input coupled to R (vehicle is in REVERSE) and a second input coupled to VR (vehicle has a rearward velocity). Thus, reverse-lights will be illuminated when either the PRNDL select mode is in REVERSE or the vehicle has a rearward velocity.

The brake-light illumination function appears at the output of OR-gate 72. That is, the brake-light will be illuminated if the brake pedal has been depressed or the vehicle is decelerating above a predetermined threshold, or the vehicle is not in PARK and is not moving, or the vehicle's headlamps are on and the vehicle is not moving.

To generate the brake-light illumination function appearing at the output of OR-gate 72, a first input of OR-gate 72 is coupled to DC (vehicle is decelerating at a predetermined threshold), a second input is coupled to B (the operator has depressed the brake pedal to slow the vehicle), and a third input is coupled to an output of AND gate 74. AND gate 74 has first, second and third inputs coupled respectively to the output of inverter 78, the output of inverter 80, and the output of OR-gate 76. OR-gate 76 has a first input coupled to H (head lamp is on) and a second input coupled to the output of inverter 82. The input of inverter 82 is coupled to VR, the input of inverter 80 is coupled to VF (the vehicle has a forward velocity), and the input of inverter 82 is coupled to P (the vehicle is in PARK).

Thus, there has been provided an intelligent light control system for use on vehicles such as automobiles, sport utility vehicles, trucks, and the like, which results in the illumination of the vehicle's reverse or back-up lights not only when the vehicle has been placed in REVERSE but also when the vehicle has a rearward velocity irrespective of the position of the PRNDL selector. Furthermore, the intelligent light control system causes the vehicle's brake-lights to be illuminated not only when the operator of the vehicle is slowing the vehicle in the customary manner as by braking, but also when (1) the vehicle is decelerating above a predetermined rate or (2) the vehicle's headlights are on but the vehicle is not moving, or (3) when the vehicle is not in PARK and the vehicle is not moving.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability or configuration of the invention in any way. For example, many algorithms or logic circuit configurations or combinations of both may be utilized to those skilled in the art of designing such systems in order to achieve the desired reverse-light control function and brake-light control function. Rather, the foregoing detailed description will provide those skilled in the art with a convenient roadmap for implementing the exemplary embodiment or exemplary embodiments. It should be understood the various changes can be made in the function and arrangement of elements without departing from the scope of the invention as set forth in the appended claims and the legal equivalence thereof.

What is claimed is:

1. A light control system for use on a vehicle having a brake for slowing the vehicle, a brake-light, and a headlight, the system comprising:
    a vehicle speed sensor; and
    a control unit coupled to said brake-light, to said headlight, and to said vehicle speed sensor, said control unit for illuminating said brake-light when said headlight is on, said vehicle is not moving, and the brake is not activated.

2. A light control system according to claim 1 further comprising a PRNDL selector coupled to said control unit, said PRNDL selector capable of selecting at least PARK and REVERSE modes of operation and wherein said control unit illuminates said brake-light when said vehicle is not in PARK and is not moving.

3. A light control system according to claim 1 wherein said control unit illuminates said brake-light when said vehicle's deceleration reaches a predetermined threshold.

4. A light control system according to claim 2 wherein said vehicle has a reverse-light coupled to said control unit and wherein said control unit illuminates said reverse-light when said vehicle is not in REVERSE and is moving backwards.

5. A light control system according to claim 4 wherein said control unit comprises:
   a transmission control module coupled to said PRNDL selector for generating a PRNDL position signal;
   a brake system coupled to said transmission control module and to said vehicle speed sensor for generating a vehicle speed signal;
   a body control module coupled to said transmission control module, said brake system and said headlight for generating a headlight signal indicative of whether said headlight is on or off; and
   an engine control module coupled to said transmission control module, said brake system, and said body control module, and responsive to said PRNDL position signal, said vehicle speed signal, and said headlight signal for selectively generating brake-light and reverse-light control signals.

6. A light control system for use on a vehicle having a brake for slowing the vehicle and a brake-light, the system comprising:
   a PRNDL selector capable of selecting at least PARK and REVERSE modes of operation;
   a vehicle speed sensor; and
   a control unit coupled to said brake-light, to said PRNDL selector and to said vehicle speed sensor, for illuminating said brake-light when said vehicle is not in PARK, said vehicle is not moving, and the brake is not activated.

7. A light control system according to claim 6 wherein said control unit illuminates said brake-light when said vehicles deceleration reaches a predetermined threshold.

8. A light control system according to claim 6 wherein said vehicle has a reverse-light coupled to said control unit and wherein said control unit illuminates said reverse-light when said vehicle is not in REVERSE and is moving backwards.

9. A light control system for use on a vehicle having a reverse-light, the system comprising:
   a vehicle speed sensor;
   a PRNDL selector coupled to said control unit, said PRNDL selector capable of selecting at least PARK and REVERSE modes of operation; and
   a control unit coupled to said reverse-light, to said vehicle speed sensor, and to said PRNDL selector, for illuminating said reverse-light when said vehicle is not in reverse and is moving backwards.

10. A light control system according to claim 9 wherein said vehicle is provided with a brake-light and wherein said control unit illuminates said brake-light when said vehicle is not in PARK and is not moving.

11. A light control system according to claim 9 wherein said vehicle has a headlight and wherein said control unit is coupled to said headlight for illuminating said brake-light when said headlight is on and said vehicle is not moving.

12. A light control system according to claim 9 wherein said control unit illuminates said brake-light when said vehicles' deceleration reaches a predetermined threshold.

13. A light control system for use in a vehicle having a brake for slowing the vehicle, a brake-light, a reverse-light and a headlight, the system comprising:
   a vehicle speed sensor;
   a PRNDL selector capable of selecting at least PARK and REVERSE modes of operation; and
   a control unit coupled to said brake-light, to said reverse-light, to said vehicle speed sensor, and to said PRNDL selector, said control unit for illuminating said reverse-light when said vehicle is not in REVERSE and is moving backwards, and for illuminating said brake-light when the brake is not activated and when (i) said headlight is on and said vehicle is not moving, (ii) said vehicle is not in PARK and is not moving and (iii) said vehicle's deceleration reaches a predetermined threshold.

14. A method for controlling the lights on a vehicle having a brake for slowing the vehicle, a brake-light, and a headlight, the method comprising:
   monitoring the speed of the vehicle;
   determining if said headlight is on or off; and
   illuminating said brake-light when said headlight is on and said vehicle is not moving irrespective of whether the brake is activated.

15. A method according to claim 14 wherein said vehicle comprises a PRNDL selector capable of selecting at least PARK and REVERSE modes of operation, said method further comprising:
   monitoring said PRNDL selector; and
   illuminating said brake-light when said vehicle is not in PARK and is not moving.

16. A method according to claim 15 further comprising:
   monitoring the vehicle's deceleration; and
   illuminating said brake-light when said vehicle's deceleration reaches a predetermined threshold.

17. A method according to claim 15 wherein said vehicle further comprises a reverse-light and wherein said method further comprises illuminating said reverse-light when said vehicle is not in REVERSE and is moving backwards.

18. A method of controlling lights on a vehicle having a brake for slowing the vehicle, a brake-light, and a PRNDL selector of the type which is capable of selecting at least PARK and REVERSE modes of operation, the method comprising:
   sensing the speed of said vehicle;
   monitoring said PRNDL selector; and
   illuminating said brake-light when said vehicle is not in PARK and is not moving irrespective of whether the brake is activated.

19. A method of controlling lights on a vehicle having a reverse-light and having a PRNDL selector capable of selecting at least PARK and REVERSE modes of operation, the method comprising:
   sensing the speed of said vehicle;
   monitoring the state of said PRNDL selector; and
   illuminating said reverse-light when said vehicle is not in REVERSE and is moving backwards.

* * * * *